UNITED STATES PATENT OFFICE.

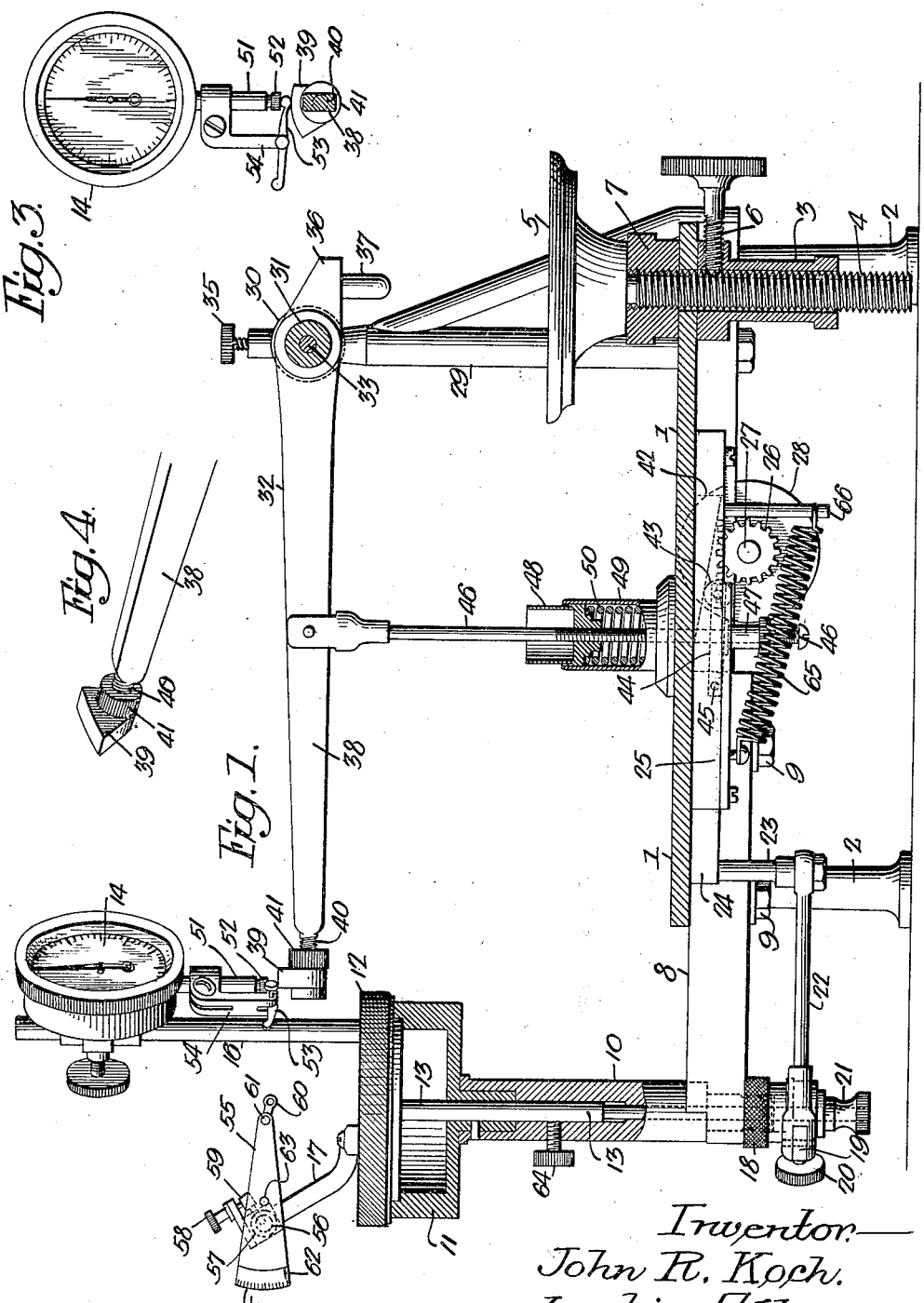

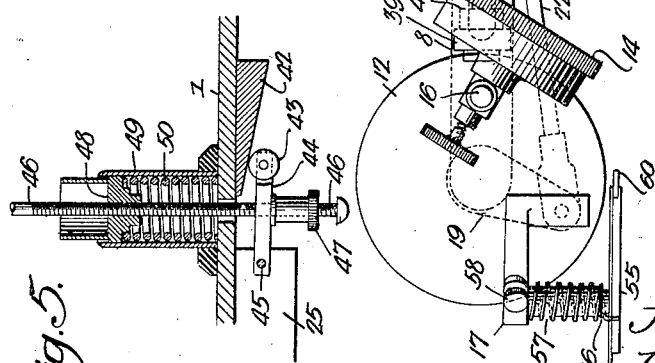

JOHN R. KOCH, OF PHILADELPHIA, PENNSYLVANIA.

GAGE.

1,351,663.  Specification of Letters Patent.  Patented Aug. 31, 1920.

Application filed November 22, 1919. Serial No. 339,924.

*To all whom it may concern:*

Be it known that I, JOHN R. KOCH, a citizen of the United States, residing in Philadelphia, Pennsylvania, have invented certain Improvements in Gages, of which the following is a specification.

One object of my invention is to construct a gage which can be set with a master piece and which will accurately and quickly caliper articles to be tested.

A further object of the invention is to make a gage which can be used in a fixed position and which will accurately indicate the size of an article.

A still further object of the invention is to provide a gage in which the article to be tested can be adjusted to the beam and in which the beam will quickly release the article.

In the accompanying drawings:—

Figure 1, is a side view, partly in section, illustrating my improved gage;

Fig. 2, is a plan view;

Fig. 3, is a face view of a portion of the dial gage;

Fig. 4, is a perspective view of a portion of the beam and its cam for actuating the gage;

Fig. 5, is a detailed sectional view, showing the wedge mechanism for moving the beam;

Fig. 6, is a detached perspective view of the sliding rack and its wedge; and

Fig. 7, is a detached perspective view of a lever actuated by the wedge for raising and lowering the beam.

Referring to the drawings, 1 is a base mounted on legs 2. Depending from this base is a socket member 3 through which extends a screw 4, carrying at its upper end a table 5. The screw is slotted throughout its length to receive the end of a set screw 6, which prevents the screw from turning in the socket 3.

Mounted on the top of the base is an adjusting nut 7, on turning which the table can be raised and lowered. Projecting from the rear of the base is a bracket 8 secured thereto, in the present instance, by screws 9. This bracket carries an upright 10 having a supporting head 11 for the indicator carrier 12, which is mounted on a shaft 13 extending through the upright. In the present instance, there are two indicators mounted on the indicator carrier, one being a dial indicator 14 and the other a segmental indicator 15. The dial indicator is mounted on a post 16 projecting from the indicator carrier, while the segmental indicator is carried by a bracket 17 secured to the indicator carrier.

The upright 10 is held to the bracket by a nut 18 and the shaft 13 is attached to an arm 19 by a set screw 20 and is held firmly in place by a screw 21 on the end of the shaft. Attached to the arm 19 is a rod 22, which is pivoted to a pin 23 on a rack 24, which is adapted to guides 25 on the under side of the base 1. The rack 24 is retracted by a spring 65 secured to a post 66 on the rack and to a pin on the under side of the table. Meshing with this rack is a gear wheel 26 on a shaft 27 turned by a hand wheel 28; on turning this hand wheel the indicator carrier is turned so as to move the indicator into and out of alinement with the cam 39 on the beam 32.

29, 29 are standards at the table end of the machine and mounted on the upper end of these standards are bearings 30 for the shaft 31 carrying the beam 32. The shaft 31 is hollow, in the present instance, as are also the bearings, and extending through the bearings and shaft is a rod 33 on which are mounted jam nuts 34; each bearing is held in place by set screws 35. The beam is in the form of a lever having a short arm 36 with a depending pin 37 and a long arm 38 having at its end a cam 39 which can be adjusted on the screw threaded end 40 of the arm and held in place by a jam nut 41.

The beam 38 is actuated by a wedge 42 on the rack 24; a roller 43 bears against this wedge and this roller is carried by a lever 44 pivoted at 45. Extending through this lever is a rod 46, which is attached to the beam 38; the rod being screw threaded. On the lower end of the rod is a nut 47 and on the other end of the rod is an adjusting nut 48 projecting from a casing 49 in which is a coiled spring 50. The spring tends to raise the beam and the nut 48 is turned to adjust the pressure of the spring and also to adjust the beam in the proper position. The dial gage 14 is actuated by a plunger 51 having an adjustable head 52, which is in contact with one arm of a lever 53 pivoted to a bracket 54 carried by the indicator casing. The frame is arranged to come in contact with the cam 39 carried by the beam 32.

In some instances, it is desirable to use a segmental indicator, as illustrated at 15. The portion 55 of the segmental indicator is mounted on a base 56 on which is a spring 57; this portion 55 can be adjusted by a set screw 58 bearing upon an arm 59. On the end of the section 55 is an arm 60, which is arranged to come in contact with the cam 39 when the indicator carrier is adjusted to bring this particular indicator into working position; this arm is pivoted at 61 and actuates a pointer 62 pivoted at 63.

64 is a screw for locking the shaft 13 in a fixed position, and when this screw locks the shaft the screw 20 is backed off to allow the rack 24 to move without turning the indicator carrier.

The operation is as follows:—My improved gage is especially adapted for use in connection with the manufacture of parts of machinery, which are made in large numbers and all of which must be identical as to gage. My improved gage is set by a master piece. The operator locates a master part on the table under the pin 37 and turns the handle 28 so as to bring the indicator into alinement with the beam, moving the beam so as to bring the pin down to the work, which raises the cam 39 in contact with the mechanism for actuating either the dial indicator or the segmental indicator, according to which one is in position. The master part is then removed and the other parts are located on the table and must register on the indicator the same as the master part. This operation is repeated as often as necessary. When another set of parts is to be tested, another master part is placed in position on the table and the above operation is repeated.

I claim:—

1. The combination in a gage, of a base; a table mounted on the base; means for adjusting the table; standards; a beam pivotally mounted on the standards and in the form of a lever; the short arm of the beam having a pin directly above the table; an indicator shiftable into and out of register with the long arm of the beam and arranged to be actuated thereby; and means for raising the beam.

2. The combination in a gage, of a base; a table, vertically adjustable on the base; a beam pivotally mounted on the base having a short and a long arm, the short arm being directly above the table; an indicator shiftable into and out of register with the long arm of the lever so as to be actuated thereby; and means for simultaneously raising the beam and shifting the indicator from an inoperative into an operative position relatively to the beam.

3. The combination in a gage, of a base; a table vertically mounted on the base; a beam pivotally mounted on standards carried by the base, the beam having a short and a long arm, the short arm being directly above the table; an upright; an indicator carrier turnably mounted on the upright; an indicator on said carrier; and means for simultaneously shifting the indicator from an inoperative position into the range of action of the long arm of the beam, and raising the long arm of said beam.

4. The combination of a base; a table adjustably mounted thereon; standards on the base; a beam pivotally mounted on the standards, said beam having a short and a long arm, the short arm being above the table; an upright projecting from the opposite end of the base from the table; a shaft in said upright; an indicator carrier mounted on the shaft and located under the long arm of said beam; an indicator thereon; an arm on the lower end of the shaft; a rack adapted to guides under the base; a connecting rod connecting the rack with said arm; and a shaft having a gear wheel meshing with the rack so that, on turning the shaft, the indicator will be brought into position to aline with the long arm of the beam.

5. The combination of a base; a table adjustably mounted thereon; standards on the base; a beam pivotally mounted on the standards, said beam having a short and a long arm, the short arm being above the table; an upright projecting from the opposite end of the base from the table; a shaft in said upright; an indicator carrier mounted on the shaft and located under the long arm of said beam; an indicator thereon; an arm on the lower end of the shaft; a rack adapted to guides under the base; a connecting rod connecting the rack with said arm; a shaft having a gear wheel meshing with the rack so that, on turning the shaft, the indicator will be brought into position to aline with the long arm of the beam; a wedge on the rack; a lever actuated by the wedge; and a rod connecting the lever with the beam so that, when the shaft is turned, the beam will be raised.

JOHN R. KOCH.